United States Patent
Matsuzaka et al.

(10) Patent No.: US 7,025,917 B2
(45) Date of Patent: Apr. 11, 2006

(54) POLYOLEFIN STRETCHED SHEET AND METHOD FOR PRODUCING THE SAME

(75) Inventors: Katsuo Matsuzaka, Kyoto (JP); Koichi Adachi, Kyoto (JP); Michiaki Sasayama, Kyoto (JP); Koji Yamaguchi, Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 37 days.

(21) Appl. No.: 10/380,103

(22) PCT Filed: Aug. 31, 2001

(86) PCT No.: PCT/JP01/07520

§ 371 (c)(1),
(2), (4) Date: Mar. 11, 2003

(87) PCT Pub. No.: WO02/22343

PCT Pub. Date: Mar. 21, 2002

(65) Prior Publication Data
US 2003/0175539 A1    Sep. 18, 2003

(30) Foreign Application Priority Data
Sep. 11, 2000  (JP)  ............................... 2000-275273

(51) Int. Cl.
  *B29C 47/00*    (2006.01)
(52) U.S. Cl. ................ 264/173.1; 526/348.2; 264/210.1; 264/211.12; 428/220

(58) Field of Classification Search ................ 525/240; 526/348.2; 428/34.9, 910, 220; 264/173.1, 264/210.1, 211.12
See application file for complete search history.

(56) References Cited

U.S. PATENT DOCUMENTS 4,996,011 A * 2/1991 Sano et al. .................... 264/28

(Continued)

FOREIGN PATENT DOCUMENTS

EP        0 933 189       * 8/1999

OTHER PUBLICATIONS

JP 2-296756, A and English abstract thereof, Dec. 1990.
JP 6-280111, A and English abstract thereof, Oct. 1990.

(Continued)

*Primary Examiner*—D. Lawrence Tarazano
(74) *Attorney, Agent, or Firm*—Townsend & Banta (57) ABSTRACT

A method for producing a polyolefin stretched sheet which comprises extruding a polyolefin having a weight average molecular weight of 100,000 to 500,000 into a primary sheet, rolling the primary sheet at a rolling magnification of 5 or more, and stretching the rolled sheet into a polyolefin sheet which is totally stretched at a stretching magnification of 15 or more. The method can be employed for producing a polyolefin stretched sheet excellent in creep resistance, tensile strength and modulus in tension, with no use of a ultra-high molecular weight polyethylene and with excellent productivity.

14 Claims, 4 Drawing Sheets

U.S. PATENT DOCUMENTS

| | | | |
|---|---|---|---|
| 5,106,555 A | * | 4/1992 | Kobayashi et al. ......... 264/112 |
| 5,445,883 A | * | 8/1995 | Kobayashi et al. ... 428/355 EN |
| 5,505,900 A | | 4/1996 | Suwanda et al. |
| 6,241,937 B1 | * | 6/2001 | Nakamura et al. .......... 264/470 |
| 2002/0098961 A1 | * | 7/2002 | Chapman et al. ............. 492/56 |
| 2002/0132950 A1 | * | 9/2002 | Smith et al. ................. 526/352 |
| 2003/0175539 A1 | * | 9/2003 | Matsuzaka et al. ......... 428/515 |

OTHER PUBLICATIONS

JP 2-258237, A and English abstract thereof, Oct. 1990.

* cited by examiner

POLYOLEFIN STRETCHED SHEET AND METHOD FOR PRODUCING THE SAME

TECHNICAL FIELD

The present invention relates to an oriented polyolefin sheet which exhibits excellent creep resistance and has high strength and elastic modulus and also to a method for production thereof.

BACKGROUND ART

Conventionally, methods have been widely utilized which produce high-strength and high-elastic-modulus polyolefins by orientating molecules of polyolefins as by drawing or spinning. It is also widely known that orientation of polyolefin by drawing readily results in the improvement of its strength and elastic modulus, if the polyolefin is polyethylene which has a high theoretical elastic modulus.

Since drawing of a material with a smaller sectional area is easier, spin drawing has been primarily selected when a target draw ratio is high, e.g., 15 or higher. Meanwhile, Japanese Patent Laying-Open No. Sho 52-77180 discloses that an oriented tape can be obtained by a sequence of roll-drawing and drawing. However, even this method has encountered the extreme difficulty in producing an oriented sheet with a width of 50 mm or greater and suffered from the one or more of the following problems: cracking occurs in the sheet during a drawing process; necking accompanied by width or thickness variation occurs; fracture of the sheet occurs.

High-density polyethylene having little side chains, among polyethylenes, can be stretched at a high ratio because of the increased occurrence of intermolecular slippage and thus can be readily increased in strength and elastic modulus by drawing. However, such polyethylene exhibits poor creep resistance due to the intermolecular slippage that is maintained at a high degree of occurrence even after it has been oriented by drawing, which has been a problem.

As measures to increase the creep resistance, Japanese Patent Laying-Open Nos. Hei 2-296756 and Hei 6-280111 disclose methods wherein an ultra-high molecular weight ethylene/α-olefin copolymer having moderate side chains is diluted with solvents, various types of waxes or the like and then gel spun.

However, the high price of the ultra-high molecular weight ethylene/α-olefin copolymer adds to the production cost of resulting oriented polyolefin sheets. In addition, the gel spinning technique has a difficulty in imparting a shape other than the needle-like shape. Further, the technique needs an additional process for solvent removal. This inevitably reduces productivity and increases a production cost.

In the attempt to increase productivity, Japanese Patent Laying-Open No. Hei 2-258237 discloses a solvent-free method in which ultra-high molecular weight polyethylene is pressed, roll-drawn and stretched to produce an oriented polyethylene tape. However, this prior art has been insufficient to obtain an oriented tape with superior creep resistance.

U.S. Pat. No. 5,505,900 discloses a production method which was focused on the productivity and creep resistance improvements. In this method, a resin composition containing polyethylene and a photoinitiator is oriented while it is crosslinked by exposure to an ultraviolet radiation. However, the orientation process disclosed in U.S. Pat. No. 5,505,900 is a uniaxial orientation process without a roll-drawing treatment and thus difficult to achieve high-ratio orientation. In addition, the resin composition used shows declining light transmittance as crosslinking proceeds, making it difficult to achieve effective ultraviolet crosslinking. This has been another problem.

SUMMARY OF THE INVENTION

In view of the current state of the preceding prior art, it is an object of the present invention to provide an oriented polyolefin sheet which can be obtained without the use of ultra-high molecular weight polyolefin that is costly and poor in processability such as extrudability, and which exhibits superior properties including creep resistance, strength, elastic modulus and productivity, as well as providing a method for production thereof.

In a broad aspect of the present invention, a method for production of an oriented polyolefin sheet is provided which includes the steps of extruding polyolefin having a weight average molecular weight in the range of 100,000–500,000 and a melting point of Tm/° C. into a primary sheet, roll-drawing the primary sheet at a ratio of at least 5 to provide a roll-drawn sheet, and stretching the roll-drawn sheet at such a selected ratio that a total drawing ratio, a product of the roll-drawing ratio and the stretch ratio, reaches 15 or above.

In a particular aspect of the production method of the present invention, in the roll-drawing step, the primary sheet at a temperature of $(Tm-60)° C.–(Tm-5)° C.$ is introduced between a pair of pressure rolls controlled at a temperature of below Tm ° C. but not below $(Tm-40)° C.$ and roll-drawn under a pressure loading within the range of 10 kgf/mm–500 kgf/mm.

In another particular aspect of the present invention, in the stretching step, the roll-drawn sheet is stretched at a ratio of at least 1.3 and at a temperature of below Tm ° C. but not below $(Tm-60)° C.$ In a further particular aspect of the present invention, the stretching step is a multi-stage stretching step which utilizes plural stretch zones and in which a stretch ratio in one draw zone is rendered higher than in a subsequent stretch zone. The provision of the plural stretch zones reduces the variations in dimension and stretch ratio of the roll-drawn sheet, prevents inconsistent heating and restrains the occurrence of necking due to the variation of number of revolutions of a delivery roll or a take-off roll.

In a further particular aspect of the present invention, in the multi-stage stretching step, the at least one roll comprises a delivery roll, a take-off roll and a group of contact rolls disposed between the delivery and take-off rolls and controlled to rotate at a constant rate, and stretching is carried out by the delivery roll, the take-off roll and the group of contact rolls such that the sheet is stretched while subjected to a frictional force acting in the stretching direction.

In a further particular aspect of the production method in accordance with the present invention, in the stretching step, a length L of continuous contact, along the direction of stretching, between each roll for use in the stretching and the sheet is maintained within 500 mm. Maintaining the contact length L within 500 mm reduces the occurrence of crack or fracture in the sheet, thereby stabilizing the stretching.

In a further particular aspect of the production method in accordance with the present invention, in the roll-drawing step, the primary sheet having a thickness of t mm is roll-drawn at a ratio of x, with the proviso that the primary sheet prior to being roll-drawn is subjected to a pulling stress of $x/5t$ MPa–20 MPa. The application of a constant pulling stress reduces the occurrence of surface waviness or wrinkle in the primary sheet while roll-drawn, thereby stabilizing the roll-drawing.

In a further particular aspect of the production method in accordance with the present invention, in the roll-drawing step, the primary sheet having a thickness of t mm is roll-drawn at a ratio of x, with the proviso that the roll-drawn sheet is taken off while subjected to a pulling stress of xt/50 MPa. The application of the specified constant pulling stress reduces the occurrence of slipping between the roll and the sheet, thereby stabilizing the roll-drawing and also increasing productivity.

In a further particular aspect of the production method of an oriented polyolefin sheet in accordance with the present invention, either during or after the stretching step, polyolefin is crosslinked. The crosslinking treatment, either during or after the stretching step, further increases creep resistance and heat resistance performances of the sheet.

In a further particular aspect of the production method in accordance with the present invention, in the extruding step, a photoinitiator is incorporated in the polyolefin which is subsequently extruded into the primary sheet containing the photoinitiator and, either during or after the stretching step, the sheet is exposed to an ultraviolet radiation so that the polyolefin is crosslinked.

In a further particular aspect of the production method in accordance with the present invention, the sheet shows a light transmittance of 60% or above at the time when it is exposed to the ultraviolet radiation. The proper control of speed and temperature conditions during the stretching enables one to obtain an oriented sheet having a high total light transmittance. Then, an energy of the exposed ultraviolet radiation can be utilized effectively for a crosslinking reaction. This enables an oriented polyolefin sheet, if thick, to crosslink even in its interior thickness portion.

In a further particular aspect of the production method in accordance with the present invention, either during or after the stretching step, the sheet is exposed to an electron beam so that the polyolefin is crosslinked.

In a further particular aspect of the production method in accordance with the present invention, in the extruding step, a polyfunctional unsaturated compound is incorporated in the polyolefin which is subsequently extruded into the primary sheet containing the polyfunctional unsaturated compound and, either during or after the stretching step, the polyolefin is crosslinked by the polyfunctional unsaturated compound. Since a crosslinking reaction is effected using the polyfunctional unsaturated compound which is more reactive than polyolefin, polyolefin is crosslinked effectively under the presence of the polyfunctional unsaturated compound which serves as a crosslinking point.

In a particular aspect of the present invention, the polyolefin used is polyethylene or polypropylene.

In another particular aspect of the present invention, the polyolefin is an ethylene-α-olefin copolymer which contains 0.1–3 moles of α-olefin having 3 or more carbon atoms per mole of a molecule of the aforementioned copolymer. The use of the ethylene-α-olefin copolymer containing the specified amount of α-olefin, particularly an ethylene-propylene copolymer or an ethylene-1-butene copolymer, enables production of an oriented polyolefin sheet with superior creep resistance.

Preferably, the ethylene-α-olefin copolymer is an ethylene-propylene or ethylene-1-butene copolymer.

In a further broad aspect of the present invention, an oriented polyolefin sheet is provided which comprises polyolefin having a weight average molecular weight of 100,000–500,000 and oriented at least 5 times in its thickness direction than in its width direction so that an orientation ratio reaches at least 15.

In a particular aspect of the oriented polyolefin sheet in accordance with the present invention, the polyolefin is crosslinked. The oriented polyolefin sheet preferably has a gel fraction of 20% or above.

EXPLANATION OF THE INVENTION (Polyolefin)

The polyolefin for use in the present invention may comprise α-olefin having a weight average molecular weight of 100,000–500,000, such as ethylene, propylene, 1-butene, 1-pentene, 1-hexene, 1-octene, 1-decene and 4-methyl-1-pentene, either alone or in combination. Specific examples of useful polyolefins include polyethylene, polypropylene and an ethylene-α-olefin copolymer. Preferred is an ethylene-α-olefin copolymer.

Examples of α-olefins include propylene, 1-butene, 1-pentene, 4-methyl-1-pentene, 1-octene, 1-decene and the like.

If high stretchability is desired, the α-olefin having a carbon number of 3–4, such as propylene or 1-butene, may preferably be used. The use of the α-olefin having a carbon number of 4, i.e., 1-butene, is particularly preferred for its ability to increase creep resistance effectively.

The above-listed α-olefins may be used alone or in combination.

The ethylene-α-olefin copolymer preferably contains the α-olefin in the amount of 0.1–3.0 moles, more preferably 0.3–1.0 moles, per mole of the ethylene-α-olefin copolymer. If the α-olefin content is below 0.1 moles, the effect of improving fatigue resistance and creep resistance of a resulting oriented polyolefin sheet may become insufficient. On the other hand, if it exceeds 3 moles, the accordingly reduced stretchability and roll drawing ability may result in the difficulty to obtain oriented polyolefin sheets with orientation ratios of 15 or above.

The α-olefin content of the copolymer can be calculated from a ratio of neighboring areas of a peak for tertiary carbon of the α-olefin and a peak for backbone methylene carbon in the NMR spectrum measured using the nuclear magnetic resonance spectrometer.

The polyolefin preferably has a weight average molecular weight of 100,000–500,000. If its weight average molecular weight is below 100,000, the polyolefin becomes brittle and less extensible to result in the failure to obtain an oriented polyolefin sheet with sufficient strength and creep resistance. On the other hand, If its weight average molecular weight exceeds 500,000, the polyolefin shows the increased melt viscosity and accordingly the reduced melt processability, such as extrudability. This necessitates the use of a solvent or plasticizer in large quantities in the stretching and thus increases the complexity of the stretching process.

Referring to the above-specified range of weight average molecular weight in terms of a melt index (hereinafter referred to as MI), the preferred MI range is 0.01–10 g/10 minutes. The MI, as used in this specification, is indicative of a melt viscosity of a thermoplastic resin and is defined in JIS K 6760.

One or more of other components such as vinyl acetate, vinyl alcohol, (meth)acrylic acid and (meth)acrylate ester may be further copolymerized with the polyolefin. However, the excessive high loading thereof reduces extensibility to result in the difficulty to effect stretching at high ratios. Hence, in the case where the other component is further copolymerized, it is preferably incorporated in the amount of up to 1 mole, more preferably up to 0.5 moles, per mole of the polyolefin.

Preferably, the ethylene-α-olefin copolymer has a molecular weight distribution (weight average molecular weight/number average molecular weight) of at least 20. The higher α-olefin content increases a melt viscosity and reduces melt processability or stretchability of the copolymer. This may result in the difficulty to effect uniaxial orientation at a ratio of 15 or above. This also requires a higher orientation tension which places a larger burden on the apparatus used.

(Photoinitiator)

In the case where ultraviolet crosslinking is utilized in the production of the oriented polyolefin sheet in accordance with the present invention, a photoinitiator is incorporated in the polyolefin. Examples of useful photoinitiators include, but not limited to, thioxanthone, benzophenone, acetophenone, benzylbenzoin and Michler's ketone. Preferred among the above-listed photoinitiators are hydrogen -abstraction type photoinitiators. Accordingly, benzophenone and thioxanthone are suitably used. The photoinitiator is generally loaded in the range of 0.1–5 parts by weight, based on 100 parts by weight of the polyolefin.

(Polyfunctional Unsaturated Compound)

In the production method in accordance with the present invention, a polyfunctional unsaturated compound may be used to crosslink the polyolefin. This polyfunctional unsaturated compound not only introduces a crosslinked structure in the oriented polyolefin sheet but also enhances melt processability and stretchability of the polyolefin in the extruding step. Examples of polyfunctional unsaturated compounds include polyfunctional (meth)acrylate, diene oligomers and olefin oligomers derived via polymerization of unsaturated compounds.

Examples of polyfunctional (meth)acrylates include diallyl phthalate, allylated cyclohexyl di(meth)acrylate, acrylated isocyanurate, bis(acryloxyneopentyl glycol) adipate, bisphenol A di(meth)acrylate, 1,4-butanediol di(meth)acrylate, 1,3-butylene glycol di(meth)acrylate, dicyclopentanyl di(meth)acrylate, ethylene glycol di(meth)acrylate, diethylene glycol di(meth)acrylate, glycerol di(meth)acrylate, 1,6-hexanediol di(meth)acrylate, long-chain aliphatic di(meth) acrylate, methoxidated cyclohexyl di(meth)acrylate, neopentyl glycol di(meth)acrylate, hydroxy- . . . neopentyl glycol di(meth)acrylate, caprolactone modified hydroxy- . . . neopentyl glycol di(meth)acrylate, pentaerythritol tri(meth)acrylate, pentaerythritol tetraacrylate, pentaerythritol tetramethacrylate, stearic acid modified pentaerythritol diacrylate, tetraethylene diglycol di(meth) acrylate, triethylene glycol di(meth)acrylate, triethylene glycol divinyl ether, trimethyrolpropane tri(meth)acrylate, tripropylene glycol di(meth)acrylate, tris(acryloxyethyl)isocyanurate, caprolactone modified tris(acryloxyethyl)isocyanurate, tris(methacryloxyethyl) isocyanurate, zinc diacrylate, zinc dimethacrylate, triallyl cyanurate, triallyl isocyanurate and the like.

Examples of diene oligomers include butadiene oligomer, isoprene oligomer, chloroprene oligomer and the like. Double bonds in these diene oligomers may be partially saturated as by addition of hydrogen or other compound. In order that the oriented sheet has a crosslinked structure, it is preferred that at least two moles of double bonds remain for 1 mole of the diene oligomer. The diene oligomer, if having an excessively high molecular weight, shows poor dispersion in the polyolefin, particularly in the ethylene-α-olefin copolymer, as well as poor stretchability. Accordingly, the diene oligomer preferably has a weight average molecular weight of up to 50,000, more preferably up to 10,000.

Examples of the olefin oligomers derived via copolymerization of unsaturated compounds include propylene oligomer, ethylene-propylene random copolymer, ethylene-butylene copolymer, compounds derived from modification of diene or other olefin oligomers at its terminal or other sites with (meth)acrylate such as methyl methacrylate ester or with a maleic acid compound such as maleic anhydride, epoxy or urethane modified compounds and the like. In view of the improved dispersibility in the ethylene-α-olefin copolymer and stretchability, such olefin oligomers preferable have a weight average molecular weight of up to 50,000, more preferably up to 10,000.

Particularly preferred among the listed polyfunctional unsaturated compounds are ethylene glycol dimethacrylate, diallyl phthalate, trimethylolpropane trimethacrylate, triallyl cyanurate and triallyl isocyanurate. These compounds show improved dispersibility and superior heat resistance, polyreactivity and nonvolatility in the production process.

The polyfunctional unsaturated compound, if used, is preferably loaded in the amount of 0.1–20 parts by weight, more preferably 0.3–5 parts by weight, based on 100 parts by weight of the polyolefin used. If the loading is below 0.1 parts by weight, the number of crosslinking points of the polyolefin may becomes insufficient to result in the failure to provide sufficient crosslinked structure. If the loading exceeds 20 parts by weight, the polyfunctional unsaturated compound may be left behind due to the insufficient reaction thereof.

(Production of Oriented Polyolefin Sheet)

In the production of the oriented polyolefin sheet in accordance with the present invention, the first step is to extrude the polyolefin having a weight average molecular weight in the range of 100,000–500,000 into the primary sheet.

In this step of obtaining the primary sheet, the polyolefin is supplied into an extruder in which it is melt kneaded and then rendered into a sheet form. The sheet forming technique is not particularly specified. Conventional roll sheeting or roll-drawing can be used. A sheeting technique using a cooling die can also be used.

Preferably, the primary sheet has a thickness in the range of 0.5–15 mm. If the primary sheet is excessively thick, a higher pressure or take-off force is required to squeeze the primary sheet, such as by pressure rolls, in the subsequent roll-drawing step. This may cause reflection of the pressure roll to result in the difficulty to effect roll-drawing uniformly across the width of the primary sheet. In contrast, if the primary sheet is excessively thin, uniform roll-drawing thereof becomes difficult because of the excessively small thickness of a roll-drawn product, i.e., a roll-drawn sheet. In addition, those pressure rolls may be caused to contact with each other to shorten their service lives.

In the case where a crosslinked structure is introduced into the oriented sheet, in the step of obtaining the primary sheet, the photoinitiator and/or the polyfunctional saturated compound may be added to the polyolefin and the resultant mixture is melt kneaded in the extruder.

The photoinitiator and/or the polyfunctional saturated compound is generally susceptible to thermal degradation and gelation. It is accordingly preferred that its residence time in the extruder is short. If the photoinitiator and/or the polyfunctional saturated compound is supplied in the liquid form, it is preferably added with pressure to the polyolefin while in a molten state within the extruder.

The polyolefin composition containing the aforementioned polyolefin, photoinitiator and/or polyfunctional unsaturated compound may preferably be melt processed at a temperature of 130° C. or above, more preferably 140° C. or above, as by an extruder. If the melt temperature is below 130° C., the polyolefin shows the tendency to melt incompletely and becomes less compatible with the polyfunctional unsaturated compound. This possibly reduces the stretchability of the composition in the subsequent stretching step. On the other hand, if the melt temperature is excessively high, the polyolefin or the photoinitiator may be caused to decompose or evaporate. Accordingly, the melt temperature is preferably controlled to fall within 250° C.

(Roll-Drawing Step)

In the present invention, the primary sheet obtained pursuant to the above procedure is then subjected to roll-drawing at a ratio of at least 5 to thereby provide a roll-drawn sheet.

The term "roll-drawing", as used herein, refers to a treatment which applies a pressure to a sheet so that the sheet is deformed into a thinner sheet while its width dimension is maintained almost unvaried. This roll-drawing technique is not particularly specified and a generally-used technique can be utilized. For example, the primary sheet is introduced between a pair of counterrotating pressure rolls with a clearance smaller in dimension than the thickness of the primary and then taken off so that the primary sheet is reduced in thickness while it is elongated.

If a pressure roll temperature is excessively low, a high level of pressure loading is required for the roll-drawing. This may result in the difficulty to achieve uniform roll-drawing. On the other hand, if the pressure roll temperature is excessively high, the primary sheet while roll-drawn may be caused to break. Accordingly, the pressure roll temperature is preferably in the range of below Tm ° C. but not below (Tm−40)° C., more preferably in the range of below Tm ° C. but not below (Tm−30)° C., further preferably in the range of (Tm−20)° C.–(Tm−5)° C., wherein Tm is a melting point of the polyolefin.

The melting point of the polyolefin refers to a maximum point of a peak of endotherm accompanying fusion, which is observed in the thermal analysis using a differential scanning calorimeter (DSC).

If a primary sheet temperature is excessively low, a high level of pressure loading is required for the roll-drawing. This may result in the difficulty to achieve uniform roll-drawing. On the other hand, if the primary sheet temperature is excessively high, roll-drawing of the primary sheet may result in the occurrence of so-called necking, i.e., thickness and width variations of the primary sheet along its length. In some cases, the primary sheet while roll-drawn may be caused to break. Accordingly, the primary sheet temperature is preferably in the range of (Tm−60)° C.–(Tm−5)° C., more preferably (Tm−50)° C.–(Tm−10)° C., further preferably (Tm−40)° C.–(Tm−15)° C.

If the pressure loading (linear pressure) applied to the primary sheet by the pressure rolls is excessively low, the contemplated roll-drawing ratio may not result. On the other hand, if it is excessively high, reflection of the pressure roll may be caused to occur. In addition, the occurrence of slippage between the pressure roll and the primary sheet may be increased. These hinder uniform roll-drawing. Accordingly, the pressure loading is preferably in the range of 10 kgf/mm–300 kgf/mm, more preferably in the range of 30 kgf/mm–100 kgf/mm.

The primary sheet is preferably roll-drawn at a ratio of at least 5, more preferably at least 7. If the roll-drawing ratio is below 5, roll-drawing may result in the failure to provide expected effects, such as reducing the occurrence of necking in the subsequent stretching step and enabling orientation at a high ratio. In addition, a burden increases in the subsequent stretching step. The roll-drawing ratio, as used herein, is defined by the following equation. Although an upper limit is not particularly specified, the higher the roll-drawing ratio is, the higher load is placed on the roll-drawing system.

Roll-drawing ratio=(cross-sectional area of the primary sheet)/(cross-sectional area of the roll-drawn sheet)

However, a difference in width of the sheet prior to and subsequent to roll-drawing is negligible. Accordingly, the following equation may be used: roll-drawing ratio=(thickness of the primary sheet)/(thickness of the roll-drawn sheet). That is, in the roll-drawing step, the sheet is thinned without substantial width variation.

The roll-drawing ratio is suitably chosen depending on the roll-drawing conditions, such as the pressure roll temperature, the primary sheet temperature and the pressure loading applied by the pressure rolls. Although the roll-drawing ratio depends slightly on the diameter of the pressure rolls and the thickness of the primary sheet, the influences of the pressure roll temperature, the primary sheet temperature and the pressure loading applied by the pressure rolls on the roll-drawing ratio are significantly large. The roll-drawing ratio appears to be more dependent on the pressure roll temperature than on the primary sheet temperature.

Preferably, a constant tension is applied to the primary sheet while being roll-drawn. In this case, the primary sheet is prevented from moving in a zigzag direction to assure stable roll-drawing. Such a constant tension is dependent on the thickness of the primary sheet and may be made higher when the primary sheet is thinner, i.e., when it becomes more difficult to stabilize the roll-drawing. However, the excessively high tension, if applied, may act to stretch the primary sheet prior to a pressure gain to the extent that could create problems such as necking.

In the case where the primary sheet having a thickness of t mm is roll-drawn at a ratio of x, the primary sheet is preferably roll-drawn while pulled with a tension of x/5t MPa–20 MPa.

During the roll-drawing, slipping may occur between the primary sheet and the pressure rolls. The excessive slipping not only reduces productivity but also makes it difficult to effect roll-drawing in a stable manner. Preferably, a take-off roll or the like may be placed downstream of the roll-drawing machine to prevent or reduce the occurrence of such slipping. In the case where the primary sheet having a thickness of t mm is roll-drawn at a ratio of x, the take-off roll is preferably controlled to apply a pulling stress of xt/50 MPa or above.

The pair of pressure rolls for use in the roll-drawing may be rotated at the same speed or at different speeds. Preferably, those two rolls are driven at different rotational speeds. Rotating the rolls at different speeds facilitates high-ratio roll-drawing and reduce the required pressure loading. In this case, a ratio in speed of a relatively high-speed pressure roll to a relatively low-speed pressure roll is preferably in the range of 1.1–3.0.

The above-described roll-drawing treatment may be practiced once, or alternatively, repeated two or more times. In the case where the roll-drawing treatment is repeated plural times, the cross-sectional area of the roll-drawn sheet, as used in the preceding equation for roll-drawing ratio, is given by a cross-sectional area of the roll-drawn sheet which went through the final roll-drawing treatment.

(Stretching Step)

In the present invention, the roll-drawn sheet obtained in the roll-drawing step is subsequently oriented by stretching to a total drawing ratio of 15 or above.

The stretching system is not particularly specified. Useful stretching systems include roll stretching and zone stretching. The use of roll stretching is preferred for its ability to eliminate the need of special equipment, facilitate control of the stretch ratio and thus increase productivity.

During the stretching, the roll-drawn sheet is heated by methods as appropriate to the case, such as hot air heating, hot water heating, infrared heating and microwave heating. Preferred among them is hot air heating which requires simple equipment and is easy to control the sheet temperature.

During the stretching, the sheet is maintained preferably within a temperature range of below Tm ° C. but not below (Tm–60)° C., more preferably within the range of (Tm–50)° C.–(Tm–5)° C., further preferably within the range of (Tm–40)° C.–(Tm–10)° C.

The excessively low sheet temperature increases the occurrence of sheet breakage during the stretching and may cause blushing and density drop of the sheet. On the other hand, the excessively high sheet temperature increases the occurrence of necking (partial variation of the stretch ratio) which produces localized orientation gain, and also increases the occurrence of sheet breakage.

The total drawing ratio, as described above, refers to a product of the roll-drawing ratio in the roll-drawing step and the stretch ratio in the stretching step.

That is;

Total drawing ratio=(roll-drawing ratio)×(stretch ratio in the stretching step)

Also, stretching is preferably effected at a ratio of 1.3–4. In the stretching step, the excessively low stretch ratio may result in the failure to increase strength, elastic modulus and creep resistance of the resulting polyolefin sheet. On the other hand, the excessively high stretch ratio may increase the occurrence of sheet breakage during the stretching. The stretch ratio, in the stretching step, is defined by the following equation:

Stretch ratio=(cross-sectional area of the roll-drawn sheet before the stretching)/(cross-sectional area of the oriented polyolefin film finally resulting from the stretching)

The stretching step may involve one stage, or two or more sequential stages of stretching. Preferably, multi-stage stretching is utilized. The multi-stage stretching is a method which carries out sequential low-ratio stretching through plural stretch zones. The smaller number of stretching stages may increase the occurrence of necking. However, the excessively larger number of stretching stages increases the size of the stretching equipment used, although effective to make the stretching more uniform and more stable.

Therefore, the number of stretching stages is preferably 2–20, more preferably 3–15, further preferably 4–10.

In the practice of the multi-stage stretching, a system may be utilized which includes delivery pinch rolls, take-off pinch rolls and at least one, preferably two or more contact rolls placed between those two types of pinch rolls and each driven at a constant rotational speed. The placement of such contact rolls enables the stretching to be carried out in a more uniform and stable manner.

The contact rolls apply a frictional force and thereby stretches the sheet without pinching. The contact rolls may be connected to the delivery rolls and/or the take-off rolls by a connecting means consisting of gears, chains, pulleys, belts or any combination thereof. However, if the speed ratio of one roll to the other is not proper, an excessive load may be exerted on a part of the system. In such a case, each roll may preferably be connected independently to a driving motor, so that the speed of each roll becomes readily controllable.

In the stretching step, the sheet is stretched by a frictional force acting in the drawing direction (MD) on each roll. The sheet is also subjected to a frictional force acting in the direction (TD) transverse to the stretching direction since the sheet is reduced in width while it is contacting each roll. Also, the higher stretch ratio and the larger width reduction, during the stretching, increase the occurrence of lengthwise tearing or cracking of the sheet as a result of the increased frictional force acting in the TD and the like. These problems become more significant when the sheet width is larger. For example, stretching of the sheet having a width of 100 mm or greater becomes extremely difficult.

If these problems are to be avoided, the width reduction of the sheet while contacting the roll must be suppressed. One specific approach is to shorten a length L of continuous contact, along the MD, between the sheet and each roll in each stretch zone. The contact length L is preferably rendered to fall within 500 mm, more preferably within 350 mm. In the case of pinch rolls which hold the sheet therebetween, the continuous contact length L on one of those rolls is preferably rendered to fall within the above-specified range.

In the present invention, the oriented polyolefin sheet in accordance with the present invention is obtained by allowing the primary sheet to pass through the sequence of roll-drawing and stretching steps such that the sheet is oriented at a total drawing ratio of at least 15. Since the roll-drawing step in which the primary sheet is oriented 5 or more times precedes the stretching step, as stated above, the stretch ratio in the stretching step can be held down. Therefore, orientation of the primary sheet, even if having a molecular weight in the range of 100,000–500,000, at a total drawing ratio of at least 15, can be achieved in a stable manner. The resulting oriented polyolefin film exhibits improved strength, elastic modulus and creep resistance, as will be demonstrated in the below-described examples.

Further, the present method enables one to stably obtain oriented polyolefin sheets having width dimensions of 100 mm or greater which have been conventionally difficult to produce.

(Crosslinking)

In the production method in accordance with the present invention, a crosslinking structure is introduced into the oriented polyolefin sheet. The crosslinking method is not particularly specified. Various crosslinking methods can be employed including (1) an ultraviolet crosslinking method wherein the aforestated photoinitiator is incorporated in the primary sheet which is subsequently crosslinked by irradiation with an ultraviolet radiation; (2) an electron beam irradiation method; (3) a method wherein a silane-grafted polymer is incorporated in the sheet which is subsequently treated with hot water; and (4) a method wherein peroxide is incorporated in the sheet which is subsequently heated to a temperature equal to or higher than a decomposition temperature of the peroxide. In the methods (1) and (2), the radicals generated by irradiation are preferably utilized for a crosslinking reaction. It is accordingly preferred that the above-described polyfunctional unsaturated compound is incorporated in the primary sheet as an auxiliary crosslinking agent.

The methods (1) and (2) are easier to control and thus preferred among the above crosslinking methods.

Preferably, such a crosslinking treatment is carried out either during or after the stretching, desirably after the sheet has been oriented 0.8 or more times of the total drawing ratio. If the crosslinking treatment is initiated before the sheet is oriented 0.8 times of the total drawing ratio, the load may be increased in the succeeding stretching, possibly causing breakage of the sheet.

Details of the above methods (1)–(4) are now described.

(1) Ultraviolet Irradiation Method

In the ultraviolet irradiation method, the above-referred photoinitiator is preloaded in the primary sheet. Preferably, the polyfunctional unsaturated compounds as also referred to above may also be loaded to increase an efficiency of crosslinking.

The ultraviolet irradiation is preferably carried out at a peak intensity of at least 20 mW/cm$^2$ and a light amount of at least 50 mJ/cm$^2$, although the dosage thereof is dependent upon the thickness and light transmittance of the sheet. If the dosage of ultraviolet irradiation is below the specified range, the proceeding of the crosslinking reaction may become insufficient, possibly resulting in the failure to achieve sufficient improvement of creep resistance.

(2) Electron Beam Irradiation Method

In the electron beam irradiation method, the electron beam dosage is generally in the range of 1–50 Mrads, preferably in the range of 3–30 Mrads, although it is varied depending on the composition and thickness of the sheet. If the electron beam dosage is below 1 Mrad, the proceeding of the crosslinking reaction may become insufficient, possibly resulting in the failure to achieve sufficient improvement of creep resistance. On the other hand, if it exceeds 50 Mrads, a polyolefin backbone may be broken to result in the reduced strength of the sheet. Also in the electron beam irradiation method, the aforesaid polyfunctional unsaturated compound may be incorporated in the sheet to increase a crosslinking efficiency.

(3) Crosslinking Method Using a Silane-Grafted Polymer

The silane-grafted polymer is not particularly specified in type and can be illustrated by silane-grafted polyethylene and silane-grafted polypropylene. The silane-grafted polymer can be obtained, for example, by graft modifying a polymer with an unsaturated silane compound.

The unsaturated silane compound refers to a compound represented by the general formula $R1SiR2_mY_{3-m}$, wherein m is 0, 1 or 2. In the formula, R1 represents an organic functional group. Examples of organic functional groups include alkenyl groups such as vinyl, allyl, propenyl and cyclohexenyl; glycidyl; amino; methacryl; and halogenated alkyl groups such as γ-chloroethyl and γ-bromoethyl.

In the formula, R2 represents an aliphatic saturated hydrocarbon group or aromatic hydrocarbon group and may be methyl, ethyl, propyl, decyl or phenyl, for example.

In the formula, Y represents a hydrolyzable organic functional group such as methoxy, ethoxy, formyloxy, acetoxy or propionoxyarylamino. When m is 0 or 1, Y's may be identical to or different from each other.

For the purpose of accelerating a crosslinking reaction, the unsaturated silane compound represented by the general formula $CH_2=CHSi(OA)_3$ may preferably be used. In this formula, A is an aliphatic saturated hydrocarbon group containing preferably 1–8, more preferably 1–4 carbon atoms. Examples of preferred unsaturated silane compounds as represented by $CH_2=CHSi(OA)_3$ include vinyltrimethoxy silane, vinyltriethoxy silane and vinyltriacetoxy silane.

The technique used to produce the silane-grafted polymer is not particularly specified and can be any technique generally known in the art. One exemplary technique involves reacting polyethylene with an unsaturated silane compound represented by $R1SiR2Y_2$ (wherein R1 is an olefinic, unsaturated monovalent hydrocarbon group or a hydrocarbonoxy group; Y is a hydrolyzable organic functional group; and R2 is R1 or Y) and organic peroxide to obtain silane-modified polyethylene.

For the above silane-grafted polymers having a silyl group, Y, if methoxy, is hydrolyzed when contacted with water to form a hydroxyl group. The hydroxyl groups in different molecules react with each other to form Si—O—Si linkages, so that the silane-grafted polymers are crosslinked to each other.

A technique used to mix the silane-grafted polymer with the polyolefin is not particularly specified, so long as it provides a uniform mixture thereof. For example, a technique may be utilized in which the polyolefin, together with the silane-grafted polymer, are fed into a single- or twin-screw extruder where they are melt mixed. In accordance with other applicable techniques, they are melt mixed using a roll, a kneader or the like.

The aforesaid water treatment technique encompasses a steam exposure technique, as well as a water immersion technique. In the case where such a treatment is carried out at a temperature of higher than 100° C., it may be performed under pressure.

In the water treatment, if a temperature of water or steam is lowered, a crosslinking reaction rate decreases. On the other hand, if it is excessively raised, the sheet is softened and melt bonded. Accordingly, the temperature of water or steam may preferably maintained at 50–130° C., particularly preferably at 90–120° C.

The shortened water treatment period may prevent the crosslinking reaction from going to completion. Thus, the water treatment period is preferably in the range of 5–12 hours. In the case where silane crosslinking is carried out using the silane-grafted polymer, a silane crosslinking catalyst may be used, if necessary. The type of the silane crosslinking catalyst is not particularly specified, so long as it promotes a crosslinking reaction between the silane-grafted polymers. Examples of silane crosslinking catalysts include dibutyltin diacetate, dibutyltin dilaurate, dioctyltin dilaurate, stannous octoate, stannous oleate, lead octoate, zinc 2-ethylhexoate, cobalt octoate, lead naphthenate, zinc caprylate, and zinc stearate.

(4) Method Using Peroxide

The peroxide to be used is not particularly specified and can be illustrated by dibutyl peroxide, dicumyl peroxide, tert-butyl cumyl peroxide and diisopropyl peroxide. The use of dicumyl peroxide and tert-butyl cumyl peroxide is preferred for their decomposition temperatures within the extrusion temperature of the resin. The use of dicumyl peroxide is particularly preferred.

The excessively high loading of the peroxide accelerates a crosslinking reaction, possibly causing coloring of the sheet. On the other hand, the excessively low loading thereof may result in the insufficient crosslinking of the polyolefin. Therefore, the peroxide is preferably loaded in the amount of 0.5–5 parts by weight, particularly preferably 1–3 parts by weight, based on 100 parts by weight of the polyolefin.

(Adhesion Imparting Treatment for Enabling Adhesion of the Sheet to Other Base Material)

For the production of a composite material using the oriented polyolefin sheet obtained in accordance with the present invention, the sheet must be adhered to the other base material. Since the oriented polyolefin sheet consists of polyolefin molecules highly oriented in one direction, it shows poor affinity and adhesion for the other base material. This problem can be solved by utilizing various methods including, for example, (a) a surface melting treatment, (b) a surface dissolution treatment and (c) adhesive coating. Out of these, the surface melting treatment (a) is suitably used which is easier to carry out and reduces a production cost.

Details of such adhesion imparting treatments are now described.

(a) Surface Melting Treatment Method

Heat is applied to melt only a surface layer of the oriented polyolefin sheet to thereby relax orientation of polyolefin molecules in the surface layer. Specifically, such a surface layer may be brought into line contact with a heat roll and the opposite side is contacted with a chill roll. In order for the oriented polyolefin sheet to be thermally bonded to the other base material, the oriented polyolefin sheet must be heated to a temperature near a melting point of the polyolefin. This heating may cause the oriented polyolefin sheet to undergo relaxation of molecular orientation in its entirety.

One approach to such a problem is to provide an adhesive layer consisting of a material having a melting point lower than that of the polyolefin and having a good affinity for the polyolefin. After the surface melting treatment of the oriented polyolefin sheet, the adhesive layer is thermally bonded to the oriented polyolefin sheet, followed by melt bonding of the other base material to the adhesive layer. Illustrative of materials which constitute such an adhesive layer are polyethylenes (low-density polyethylenes, linear low-density polyethylenes, high-density polyethylenes and the like). Preferred among them are low-melting, linear low-density polyethylenes. Particularly preferred are linear low-density polyethylenes produced via polymerization under the presence of a metallocene catalyst. When the adhesive layer is provided, the sheet can be adhered to the other base material at a lower temperature and the resulting composite exhibits higher strength than when the adhesive layer is absent.

Figure 5:
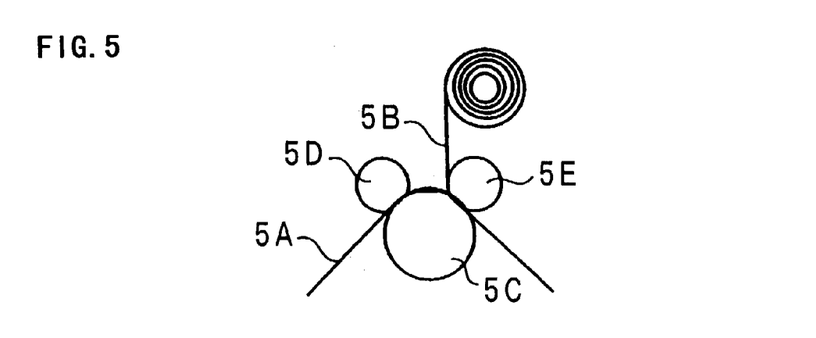
FIG. 5 is a schematic constitutional view which explains a method whereby an oriented polyolefin sheet is caused to melt at its surface.

Depending on its contemplated use, one or both surfaces of the oriented polyolefin sheet may be subjected to the surface melting treatment. FIG. 5 is a schematic constitutional view which explains this surface melting treatment. As shown in FIG. 5, the oriented polyolefin sheet 5A is fed between the chill roll 5C and the heat roll 5D, and the base material 5B is fed between the chill roll 5C and the heat roll 5E, so that the base material 5B is bonded to a melt-treated surface of the oriented polyolefin sheet 5A.

Figure 6:
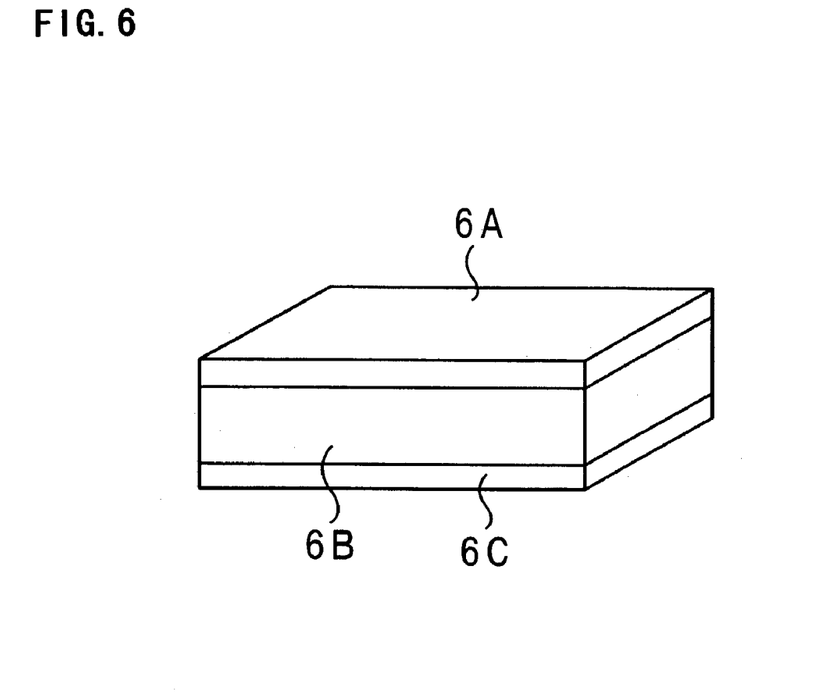
FIG. 6 is a schematic perspective view, showing an oriented polyolefin sheet provided with an adhesive layer.

FIG. 6 is a schematic perspective view, showing the oriented polyolefin sheet coated with the adhesive layer. In FIG. 6, the oriented polyolefin sheet 6B is shown to carry the adhesive layers 6A and 6C on its respective surfaces.

(b) Surface Dissolution Treatment Method

Analogous to the surface melting treatment method, the surface dissolution treatment method relaxes orientation of polyolefin molecules in a surface layer of the oriented polyolefin sheet. More specifically, it dissolves a surface of the oriented polyolefin sheet by using a low-molecular compound. Those substances which show high affinities for the polyolefin, i.e., have solubility parameters close to the solubility parameter (SP value) of the polyolefin, are suitable for use as the low-molecular compound. For example, substances having molecular structures similar to that of the polyolefin, such as octane, nonane and decane, and nonpolar substances such as benzene, toluene and xylene, are useful. The polymeric monomer may also be used to improve adhesive properties. Examples of such polymeric monomers include styrene; divinyl benzene; diallyl phthalate; (meth) acrylic monomers such as trimethyrolpropane trimethacrylate, tripropylene glycol diacrylate and glycidyl methacrylate; and the like.

Similar to the surface melting treatment method, the surface dissolution treatment method preferably utilizes the adhesive layer.

(c) Adhesive Coating Method

In the adhesive coating method, the oriented polyolefin sheet is bonded to the other base material by an adhesive coated on one or both surfaces of the oriented polyolefin sheet. In this case, such an adhesive may be suitably chosen from those which show good adhesion to both the oriented polyolefin sheet and the base material.

(Applicable Uses of the Oriented Polyolefin Sheet)

The oriented polyolefin sheet in accordance with the present invention shows superior strength and elastic modulus and exhibits high creep resistance when a proper type of polyolefin, such as ethylene or 1-butene copolymer, is used. Accordingly, it can be applied effectively for uses which demand creep resistance, e.g., as a reinforcing material for high-pressure tubings. For example, the oriented polyolefin sheet obtained in accordance with the present invention can be used as a reinforcement by winding the oriented polyolefin sheet round a thermoplastic, preferably a polyolefin tubing. Also preferably, an outer layer is provided to protect the oriented polyolefin sheet. The thermoplastic tubing may or may not be bonded to the oriented polyolefin sheet. Likewise, the outer layer may or may not be bonded to the oriented polyolefin sheet. However, they are preferably bonded to the oriented polyolefin sheet to prevent water from entering from an end of the tubing. This makes them suitable for use as a joint or the like. One exemplary construction of the high-pressure tubing is shown in FIG. 7.

Figure 7:
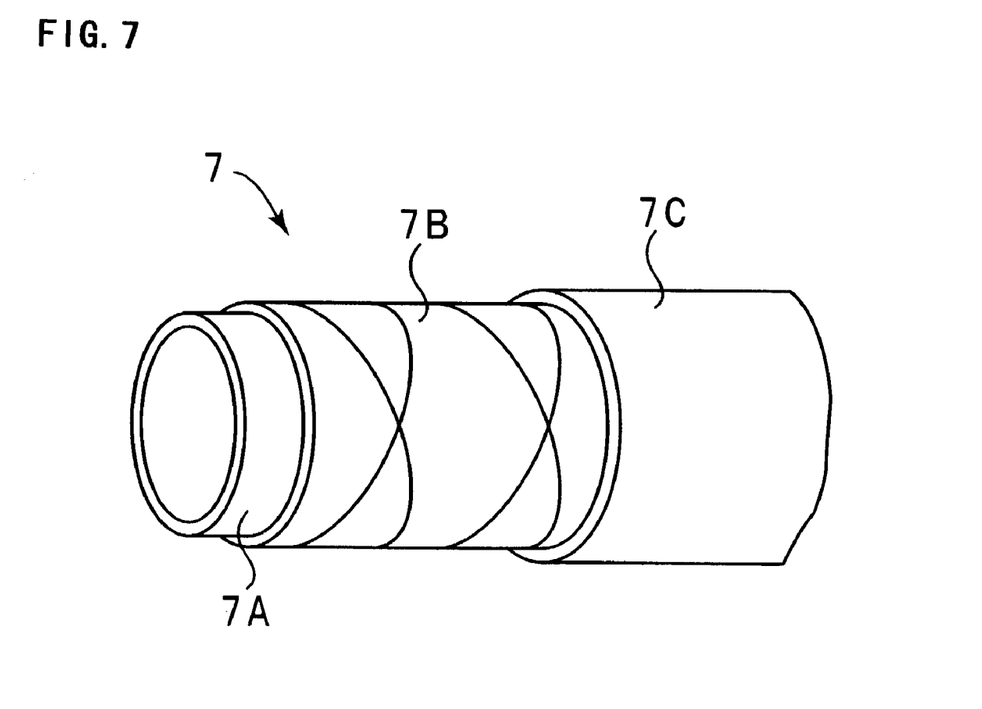
FIG. 7 is a partially cut-away perspective view, showing an exemplary high-pressure pipe construction using the oriented polyolefin sheet according to the present invention as a reinforcing member.

In the high-pressure tubing 7 shown in FIG. 7, the oriented polyolefin sheet 7B obtained in accordance with the present invention is wound round a peripheral surface of a tubing 7A made of a thermoplastic resin and an outer layer 7C is provided to cover an outer surface of the oriented polyolefin sheet.

Figure 8:
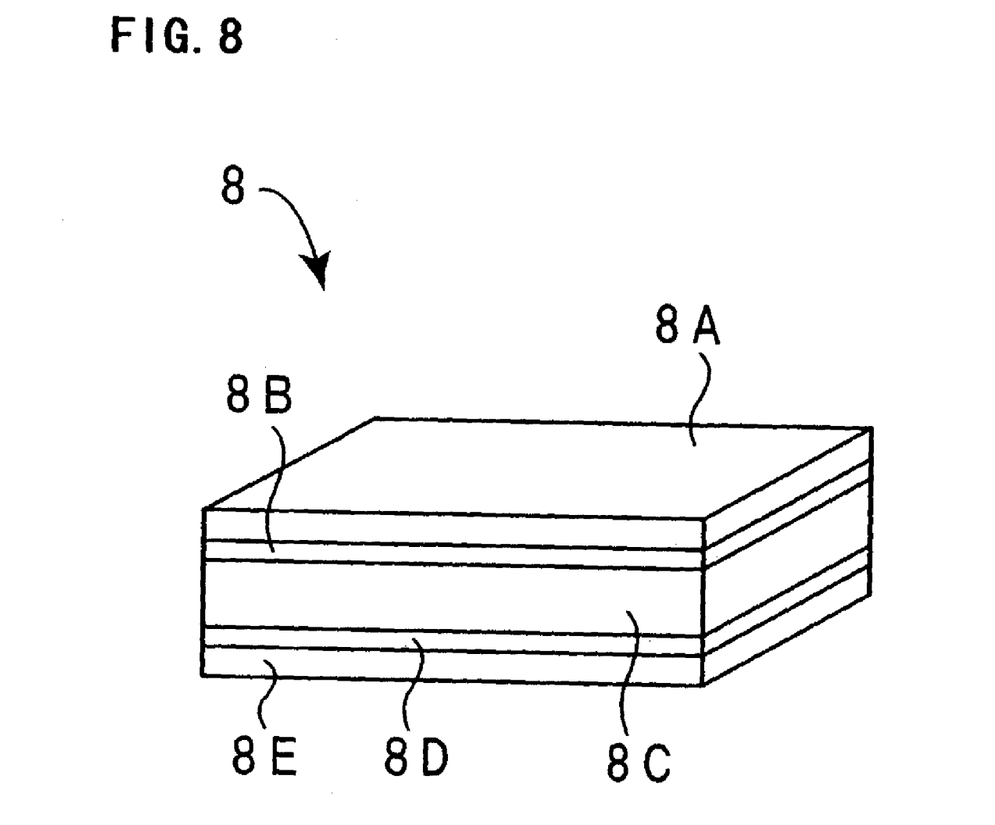
FIG. 8 is a perspective view, showing a laminate sheet obtained with the use of the oriented polyolefin sheet according to the present invention.

Also because the oriented polyolefin sheet in accordance with the present invention has a high elastic modulus, the oriented polyolefin sheet is useful in constructing a laminate panel by placing it on both surfaces of a plate-form base material, e.g., a low-elastic-modulus base material such as a foam. Such a laminate panel has a high elastic modulus due to the incorporation of the oriented polyolefin sheet in accordance with the present invention. In addition, the linear expansion coefficient of the oriented polyolefin sheet in accordance with the present can be reduced to below 0, if the orientation ratio and the type of the polyolefin used are properly selected. The laminate panel incorporating this oriented polyolefin sheet exhibits a low coefficient of linear expansion and extremely high dimensional stability. FIG. 8 shows one embodiment of such a laminate panel. In the laminate panel 8 shown in FIG. 8, the oriented polyolefin sheets 8A and 8E are bonded to opposite sides of the plate-form base material 8C by the respective adhesive layers 8B and 8D.

Further, a laminate panel may be constructed which comprises a sequence of superimposed, oriented polyolefin sheets in accordance with the present invention. Such a laminate panel has particularly high flexural modulus, strength and elastic modulus, and a further improved impact resistance.

EXAMPLES

The following examples and comparative examples specifically illustrate the practice of the present invention but are not intended to be limiting thereof.

Example 1

Figure 1:
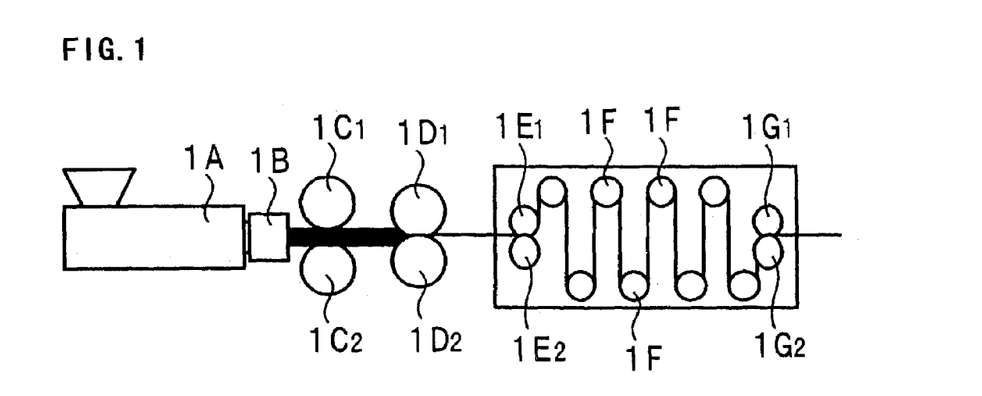
FIG. 1 is a view, showing a general construction of an apparatus for production of an oriented polyolefin sheet, as used in the production method of Example 1.

An oriented polyolefin sheet was obtained using an equipment shown in FIG. 1. An ethylene-butene copolymer (melting point 135° C., melt index (MI)=0.16 g/10 minute, 1-butene content 0.4 moles/molecule) was used as a raw material. This raw material was melt kneaded in an extruder 1A and extruded from a machine 1B into a 3 mm thick and 270 mm wide primary sheet. The primary sheet was taken off at a rate of 1 m/min by take-off rolls $1C_1$ and $1C_2$ and then transferred between a pair of pressure rolls $1D_1$ and $1D_2$.

The primary sheet was roll-drawn between the pressure rolls $1D_1$ and $1D_2$ under conditions of a primary sheet temperature of 110° C., a pressure roll temperature of 125° C. and a pressure loading of 100 kgf/mm, while the sheet was subjected to a pulling tension of 3 MPa, so that the sheet was roll-drawn at a ratio of 10. The roll-drawn sheet was 0.3 mm thick. During the roll-drawing, the sheet was transported at a rate of 10 m/min. The roll-drawn sheet was taken off by delivery rolls $1E_1$ and $1E_2$ so that a pulling stress of 60 MPa was applied to the sheet.

Next, the such-obtained roll-drawn sheet was stretched by a multi-stage stretching equipment comprising, in sequence, the delivery rolls $1E_1$ and $1E_2$, a group of contact rolls 1F and a pair of take-off rolls $1G_1$ and $1G_2$. Those rolls $1E_1$, $1E_2$, $1G_1$, $1G_2$ and 1F were driven by independent motors, respectively. This multi-stage stretching equipment included 9-stage stretch zones and operated such that the sheet was stretched at a ratio of 2 in the stretching step. In this stretching step, the continuous contact length L between the sheet and each roll was controlled at 250 mm, and a rate of transportation was set at 20 m/min.

The above procedures resulted in obtaining an oriented polyolefin film having a total drawing ratio of 20.

Example 2

Figure 2:
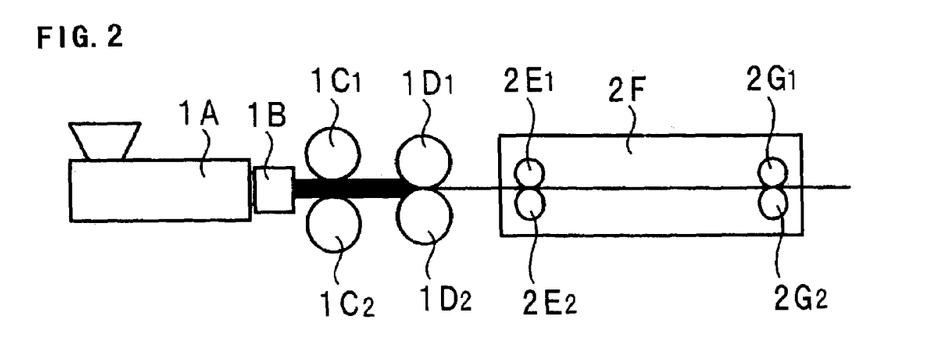
FIG. 2 is a view, showing a general construction of an apparatus for production of an oriented polyolefin sheet, as used in the production method of Example 2.

The equipment shown in FIG. 2 was used. In Example 2, the stretching step was carried out using a single-stage stretching equipment 2F. That is, the stretching equipment 2F consisted of a pair of delivery rolls 2E1 and 2E2 and a pair of take-off rolls 2G1 and 2G2 which defined a single-stage stretch zone. The procedure of Example 1 was followed, except that this stretching equipment was used, to prepare an oriented polyolefin sheet having a total drawing ratio of 20. Slight necking was observed in the oriented polyolefin sheet.

Example 3

The procedure of Example 1 was followed, except that the sheet temperature in the stretching step was controlled at 85° C., to obtain an oriented polyolefin sheet having a total drawing ratio of 20.

Example 4

The procedure of Example 1 was followed, except that the sheet temperature in the stretching step was controlled at 70° C. and the total drawing ratio was changed to 18, to obtain an oriented polyolefin sheet. Blushing was observed in the oriented polyolefin sheet. Further stretching thereof was attempted to increase the total drawing ratio but resulted in the breakage of the sheet.

Example 5

The procedure of Example 1 was followed, except that the sheet temperature in the stretching step was controlled at 40° C. and the total drawing ratio was changed to 16, to obtain an oriented polyolefin sheet. Blushing was observed in the oriented polyolefin sheet.

Also in Example 5, the attempt to further increase the total drawing ratio resulted in the breakage of the sheet.

Example 6

The procedure of Example 1 was followed, except that the primary sheet temperature in the roll-drawing step was set at 80° C., the roll-drawing ratio was reduced to 9 and the total drawing ratio was reduced to 18, to obtain an oriented polyolefin sheet. In Example 5, the attempt to further increase the total drawing ratio resulted in the breakage of the sheet.

Example 7

The procedure of Example 1 was followed, except that the primary sheet temperature in the roll-drawing step was set at 60° C., the roll-drawing ratio was reduced to 8.5, to obtain an oriented polyolefin sheet. Accordingly, the total drawing ratio was 17.

The pressure loading for the roll-drawing in Example 6 was increased to 180 mm/kg but the roll-drawing ratio remained almost unvaried.

Example 8

In the roll-drawing step, the roll-drawn sheet was taken off at a speed of 3.6–4.5 m/min (with a pressure roll speed set at 10 m/min) such that a pulling stress of 0.5 MPa was applied to the roll-drawn sheet. Otherwise, the procedure of Example 1 was followed to obtain an oriented polyolefin sheet. In the roll-drawing step, slipping of the sheet occurred to result in the failure of the sheet to reach the set speed. Also, the sheet speed was found to be unstable.

Example 9

In the roll-drawing step, roll-drawing was carried out such that a pulling stress of 0.5 MPa was applied to the primary sheet. Otherwise, the procedure of Example 1 was followed to obtain an oriented polyolefin sheet.

Prior to the roll-drawing step, waviness of the primary sheet occurred. The oriented polyolefin sheet was obtained at the beginning but fracture of the sheet occurred in about 10 minutes.

Example 10

In the stretching step, the diameter of each contact roll was changed to 350 mm and the continuous contact length L between the contact roll and the sheet was changed to 550 mm. Otherwise, the procedure of Example 1 was followed to prepare an oriented polyolefin sheet. Longitudinal cracking occurred in a near central part of the oriented polyolefin sheet.

Example 11

In the stretching step, the delivery rolls $1E_1$ and $1E_2$, the take-off rolls $1G_1$ and $1G_2$ and the group of contact rolls 1F were connected to each other by gears and chains and driven by a single motor. Otherwise, the procedure of Example 1 was followed to prepare an oriented polyolefin sheet. Severe necking and dispersive blushing were observed in the oriented polyolefin sheet. After 10 minutes from the initiation of preparing the oriented polyolefin sheet, fracture of the sheet was observed in the stretching step.

Example 12

Figure 3:
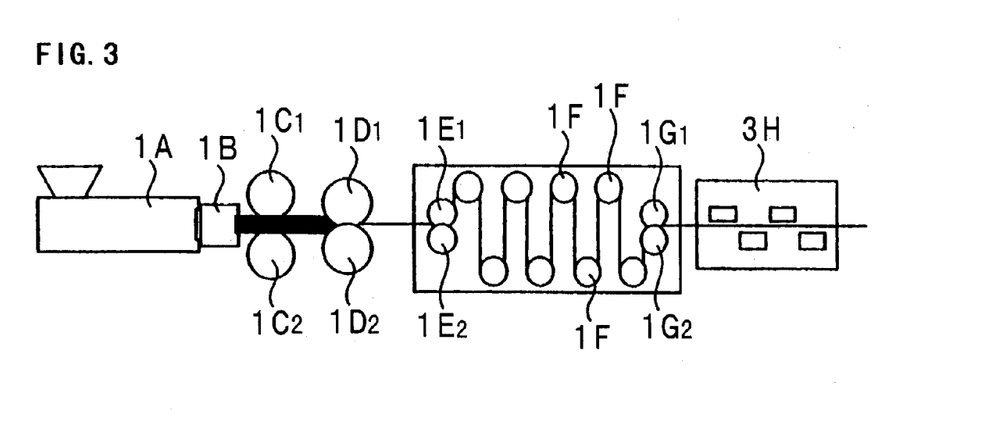
FIG. 3 is a view, showing a general construction of an apparatus for production of an oriented polyolefin sheet, as used in the production method of Example 12.

The equipment shown in FIG. 3 was utilized. The equipment shown in FIG. 3 was similar to the equipment of Example 1 but additionally included, downstream thereof, four mercury lamps 3H for a crosslinking treatment.

In Example 12, the raw material incorporated 0.6 parts by weight of benzophenone as the photoinitiator and 1.2 parts by weight of triallyl isocyanurate as the polyfunctional unsaturated compound, based on 100 parts by weight of the ethylene-1-butene copolymer as used in Example 1. The sheet from the stretching step was subjected to a crosslinking treatment by the four mercury lamps 3H having an output of 120 W/cm², two above the sheet and two below the sheet, while it was transported at a speed of 20 m/min. When exposed to an ultraviolet radiation from these mercury lamps, the oriented sheet exhibited a total light transmittance of 80%. Otherwise, the procedure of Example 1 was followed.

Example 13

In the stretching step, the stretching temperature was changed to 90° C. After the stretching step, a crosslinking treatment was carried out, as analogous to Example 12. Otherwise, the procedure of Example 12 was followed to obtain an oriented polyolefin sheet. When exposed to an ultraviolet radiation, the sheet exhibited a total light transmittance of 55%.

Example 14

The procedure of Example 12 was followed, except that the polyfunctional unsaturated compound was not incorporated, to obtain an oriented polyolefin sheet.

Example 15

Figure 4:
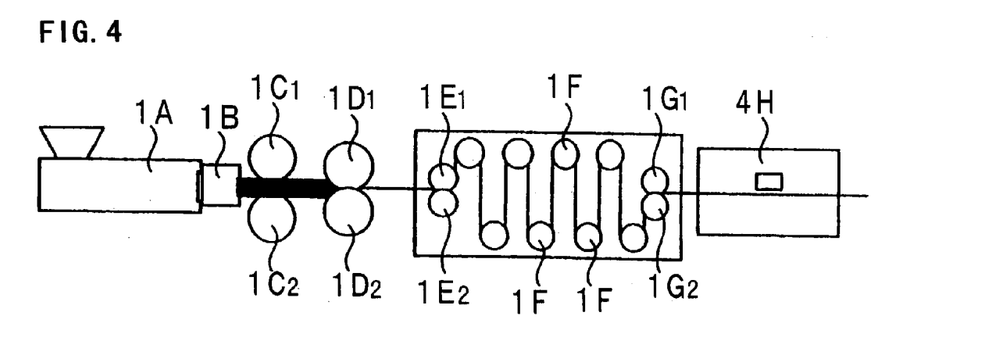
FIG. 4 is a view, showing a general construction of an apparatus for production of an oriented polyolefin sheet, as used in the production method of Example 15.

An oriented polyolefin sheet was produced using the equipment shown in FIG. 4. The equipment shown in FIG. 4 was similar to the equipment of Example 1 but additionally included, downstream thereof, an electron beam irradiation device 4H for a crosslinking treatment.

In Example 15, the polyfunctional unsaturated compound was incorporated in the amount of 1.2 parts by weight, based on 100 parts by weight of the ethylene-1-butene copolymer and the crosslinking treatment was carried out by exposure to 100 Mrads of an electron beam from the electron beam irradiation device 4H, instead of exposure to an ultraviolet radiation. Otherwise, the procedure of Example 12 was followed to prepare an oriented polyolefin sheet.

Example 16

The procedure of Example 15 was followed, except that the polyfunctional unsaturated compound was not incorporated, to obtain an oriented polyolefin sheet.

Example 17

An ethylene-propylene copolymer (melting point 134° C., weight average molecular weight 280,000, melt index (MI) =0.33 g/10 minutes, propylene content 0.8 moles/molecule) was used as a raw material. Otherwise, the procedure of Example 1 was followed to obtain an oriented polyolefin sheet. A total drawing ratio was 20.

Example 18

0.6 parts by weight of benzophenone as the photoinitiator and 1.2 parts by weight of triallyl isocyanurate as the polyfunctional unsaturated compound were added to 100 parts by weight of the ethylene-1-butene copolymer. The crosslinking treatment was carried out by irradiation with a mercury lamp, as analogous to Example 12. Otherwise, the procedure of Example 17 was followed to obtain an oriented polyolefin sheet. When exposed to an ultraviolet radiation, the sheet exhibited a total light transmittance of 92%.

Example 19

Polyethylene (melting point 135° C., weight average molecular weight 290,000, melt index (MI)=0.4 g/10 minutes, α-olefin content unmeasurable) was used as a raw material. Otherwise, the procedure of Example 1 was followed to obtain an oriented polyolefin sheet.

Example 20

0.6 parts by weight of benzophenone as the photoinitiator and 1.2 parts by weight of triallyl isocyanurate as the polyfunctional unsaturated compound were added to 100 parts by weight of polyethylene. Ultraviolet irradiation was carried out in the same manner as in Example 12. Otherwise, the procedure of Example 19 was followed to obtain an oriented polyolefin sheet. When exposed to an ultraviolet radiation, the sheet exhibited a total light transmittance of 93%.

Example 21

Homopolypropylene (melting point 167° C., weight average molecular weight 320,000, melt index (MI)=0.33 g/10 minutes) was used as a raw material. In the roll-drawing step, the primary sheet temperature was controlled at 120° C., the pressure roll temperature at 150° C., the pressure loading at 100 kgf/mm, the roll-drawing ratio at 6 and the sheet speed at 6 m/min. In the stretching step, the sheet temperature was controlled at 145° C., the stretch zones at 9 stages, the stretch ratio at 2.8, and the sheet speed at 17 m/min. Otherwise, the procedure of Example 1 was followed to obtain an oriented polyolefin sheet. The roll-drawn sheet obtained in the roll-drawing step was 0.5 mm thick. A total drawing ratio was 17.

Example 22

0.6 parts by weight of benzophenone as the photoinitiator and 1.2 parts by weight of triallyl isocyanurate as the polyfunctional unsaturated compound were incorporated in 100 parts by weight of the homopolyethylene used in Example 21. Ultraviolet crosslinking was carried out in the same manner as in Example 12. Otherwise, the procedure of Example 21 was followed to obtain an oriented polyolefin sheet. When exposed to an ultraviolet radiation, the sheet exhibited a total light transmittance of 88%.

Example 23

Random polypropylene (melting point 141° C., weight average molecular weight 320,000, melt index (MI)=0.8 g/10 minutes) was used as a raw material. In the roll-drawing step, the primary sheet temperature was controlled at 120° C., the pressure roll temperature at 130° C., the pressure loading at 100 kgf/mm, the roll-drawing ratio at 6, the thickness of the roll-drawn sheet at 0.5 mm and the sheet speed at 6 m/min.

In the stretching step, the sheet temperature was controlled at 130° C., the stretch zones at 9 stages, the stretch ratio at 2.8 and the sheet speed at 17 m/min.

Otherwise, the procedure of Example 1 was followed to obtain an oriented polyolefin sheet. A total drawing ratio was 17.

Example 24

0.6 parts by weight of benzophenone as the photoinitiator and 1.2 parts by weight of triallyl isocyanurate as the polyfunctional unsaturated compound were added to 100 parts by weight of the random polypropylene. Ultraviolet crosslinking was carried out in the same manner as in Example 12. Otherwise, the procedure of Example 23 was followed to obtain an oriented polyolefin sheet. When exposed to an ultraviolet radiation, the sheet exhibited a total light transmittance of 88%.

Example 25

Poly-1-butene (melting point 127° C., weight average molecular weight 380,000, melt index (MI)=0.5 g/10 minutes) was used as a raw material. In the roll-drawing step, the primary sheet temperature was controlled at 100° C., the pressure roll temperature to 120° C., the pressure loading at 100 kgf/mm, the roll-drawing ratio at 6, the thickness of the roll-drawn sheet at 0.5 mm and the sheet speed at 6 m/min.

In the stretching step, the sheet temperature was controlled at 115° C., the stretch zones at 9 stages, the stretch ratio at 2.8 and the sheet speed at 17 m/min.

Otherwise, the procedure of Example 1 was followed to obtain an oriented polyolefin sheet. A total drawing ratio was 17.

Example 26

0.6 parts by weight of benzophenone as the photoinitiator and 1.2 parts by weight of triallyl isocyanurate as the polyfunctional unsaturated compound were added to 100 parts by weight of the poly-1-butene. Ultraviolet crosslinking was carried out in the same manner as in Example 12. Otherwise, the procedure of Example 25 was followed to obtain an oriented polyolefin sheet. When exposed to an ultraviolet radiation, the sheet exhibited a total light transmittance of 85%.

Comparative Example 1

Polyethylene (melting point 134° C., weight average molecular weight 1,050,000, α-olefin content unmeasurable) was used as a raw material. The attempt to prepare an oriented polyolefin sheet was made by otherwise following the procedure of Example 1. However, fracture of the sheet occurred in the roll-drawing step to result in the failure to obtain an oriented polyolefin sheet.

Comparative Example 2

An ethylene-1-butene copolymer (melting point 133° C., weight average molecular weight 1,020,000, 1-butene content 0.5 moles/molecule) was used as a raw material. The attempt to prepare an oriented polyolefin sheet was made by otherwise following the procedure of Example 1. However, fracture of the sheet occurred in the roll-drawing step to result in the failure to obtain an oriented polyolefin sheet.

Comparative Example 3

The procedure of Example 12 was followed, except that in the stretching step the stretch ratio was changed to 1.3 and the sheet speed was altered to 13 m/min, to obtain an oriented polyolefin sheet. A total drawing ratio was 13.

Comparative Example 4

The roll-drawing step was not carried out. In the stretching step, the sheet temperature was controlled at 120° C., the stretch zones at 9 stages, the stretch ratio at 15 and the sheet speed at 15 m/min. Otherwise, the procedure of Example 12 was followed to prepare an oriented polyolefin sheet. A total drawing ratio was 15. Severe necking appeared. After 5 minutes from initiation of sheet preparation, fracture occurred in the sheet.

Comparative Example 5

In the roll-drawing step, the roll-drawing ratio was controlled at 4 and the sheet speed at 4 m/min. In the stretching step, the sheet temperature was controlled at 120° C., the stretch zones at 9 stages, the stretch ratio at 4 and the sheet speed at 16 m/min. Otherwise, the procedure of Example 12 was followed to prepare an oriented polyolefin sheet. A total drawing ratio was 16. Severe necking appeared in the oriented polyolefin sheet. After about 8 minutes from initiation of sheet production, fracture occurred in the sheet.

Evaluation of Examples and Comparative Examples

The total drawing ratio and the gel fraction for each of the oriented polyolefin sheets obtained in the preceding examples is reported in the following Table 1.

The tensile modulus, tensile strength and creep rupture time were measured for each sheet according the following procedures.

Tensile modulus and tensile strength: A tensile tester (product of Orientech Co., Ltd., product name: "TENSILON") was utilized to perform a tensile test on each oriented polyolefin in accordance with JIS K 7113. The sheet was pulled in its orientation direction. The tensile modulus and the tensile strength were determined by this tensile test.

Creep rupture time: The tensile tester used in the tensile tester was utilized to subject each oriented polyolefin sheet to a constant stress of 240 MPa in its orientation direction until fracture occurred and the measured time was taken as the creep rupture time.

TABLE 1

| | Total Drawing Ratio | Gel Fraction | Elastic Modules | Strength | Creep Rupture Time |
|---|---|---|---|---|---|
| Ex. 1 | 20 | 0% | 15.4 GPa | 582 MPa | 37.1 Hours |
| Ex. 2 | 20 | 0% | 15.2 GPa | 577 MPa | 35.5 Hours |
| Ex. 3 | 20 | 0% | 15.1 GPa | 580 MPa | 34.1 Hours |
| Ex. 4 | 18 | 0% | 13.4 GPa | 542 MPa | 25.2 Hours |
| Ex. 5 | 16 | 0% | 12.8 GPa | 533 MPa | 25.0 Hours |
| Ex. 6 | 18 | 0% | 12.8 GPa | 512 MPa | 24.1 Hours |
| Ex. 7 | 17 | 0% | 11.5 GPa | 490 MPa | 18.5 Hours |
| Ex. 8 | 20 | 0% | 15.1 GPa | 580 MPa | 36.1 Hours |
| Ex. 9 | 20 | 0% | 15.0 GPa | 570 MPa | 34.2 Hours |
| Ex. 10 | 20 | 0% | 15.3 GPa | 575 MPa | 33.0 Hours |
| Ex. 11 | 20 | 0% | 15.0 GPa | 566 MPa | 32.0 Hours |
| Ex. 12 | 20 | 40% | 15.1 GPa | 580 MPa | 1965.0 Hours |
| Ex. 13 | 20 | 25% | 14.5 GPa | 558 MPa | 324.0 Hours |
| Ex. 14 | 20 | 20% | 15.2 GPa | 575 MPa | 213.0 Hours |
| Ex. 15 | 20 | 38% | 15.0 GPa | 565 MPa | 1583.0 Hours |
| Ex. 16 | 20 | 28% | 15.1 GPa | 561 MPa | 556.0 Hours |
| Ex. 17 | 20 | 0% | 19.8 GPa | 612 MPa | 3.5 Hours |
| Ex. 18 | 20 | 41% | 19.3 GPa | 603 MPa | 19.2 Hours |
| Ex. 19 | 20 | 0% | 20.5 GPa | 610 MPa | 0.9 Hours |
| Ex. 20 | 20 | 40% | 19.8 GPa | 605 MPa | 7.5 Hours |
| Ex. 21 | 17 | 0% | 8.3 GPa | 345 MPa | 0.1 Hours |
| Ex. 22 | 17 | 7% | 8.2 GPa | 338 MPa | 0.3 Hours |
| Ex. 23 | 17 | 0% | 6.9 GPa | 312 MPa | 0.1 Hours |
| Ex. 24 | 17 | 8% | 6.5 GPa | 305 MPa | 0.2 Hours |
| Ex. 25 | 17 | 0% | 5.8 GPa | 303 MPa | 0.1 Hours |
| Ex. 26 | 17 | 5% | 5.7 GPa | 295 MPa | 0.2 Hours |
| Comp. Ex. 1 | Fractured During Roll-drawing | | | | |
| Comp. Ex. 2 | Fractured During Roll-drawing | | | | |
| Comp. Ex. 3 | 13 | 58% | 9.8 GPa | 431 MPa | 1.5 Hours |
| Comp. Ex. 4 | 15 | 11% | 10.8 GPa | 460 MPa | 1.8 Hours |
| Comp. Ex. 5 | 16 | 27% | 12.1 GPa | 523 MPa | 0.8 Hours |

EFFECTS OF THE INVENTION

In the method for production of an oriented polyolefin sheet in accordance with the present invention, polyolefin having a weight average molecular weight of 100,000–500,00 is first formed into a primary sheet which is subsequently roll-drawn at a ratio of at least 5. The roll-drawn sheet is then stretched so that a total drawing ratio reaches 15. This enables production of an oriented polyolefin sheet, in accordance with the present invention, which not only exhibits superior mechanical strength and elastic modulus but also shows improved creep resistance.

Also, the present invention eliminates the necessity of using ultra-high molecular weight polyolefins. This increases processibility and enables one to obtain a broad oriented polyolefin sheet with high productivity.

The invention claimed is:

1. A method for production of an oriented polyolefin sheet comprising the steps of:
   (a) extruding polyolefin having a weight average molecular weight of 100,000–500,000 into a primary sheet;
   (b) roll-drawing said primary sheet having a thickness of t mm at a roll-drawing ratio of at least x (having a value of at least 5) to provide a roll-dawn sheet, with a proviso that the primary sheet prior to being roll-drawn is subjected to a pulling stress in a range of x/5t MPa to 20 MPa and the roll-drawn sheet is taken off while subjected to a pulling stress of at least xt/50 MPa; and
   (c) stretching said roll-drawn sheet using at least one roll such that a total drawing ratio, a product of said roll-drawing ratio and the stretch ratio, is at least 15.

2. The method for production of an oriented polyolefin sheet as recited in claim 1, wherein Tm is a melting point of the oriented polyolefin, and, in the roll-drawing step, said primary sheet at a temperature of (Tm−60)° C.–(Tm−5)° C. is introduced between a pair of pressure rolls controlled at a temperature of below Tm° C. but not below (Tm−40)° C., and roll-drawn under a pressure loading within the range of 10 kgf/mm–500 kgf/mm.

3. The method for production of an oriented polyolefin sheet as recited in claim 1, wherein, in the stretching step (c), the roll-drawn sheet is stretched at a ratio of at least 1.3 and at a temperature below a melting point Tm of the oriented polyolefin, but not below (Tm−60)° C.

4. The method for production of an oriented polyolefin sheet as recited in claim 1, wherein the stretching step (c) is a multi-stage stretching step which utilizes plural stretch zones and in which a stretch ratio in one stretch zone is rendered higher than in a subsequent stretch zone.

5. The method for production of an oriented polyolefin sheet as recited in claim 4, wherein, in the multi-stage stretching step (c), the at least one roll comprises a delivery roll, a take-off roll and a group of contact rolls disposed between the delivery and take-off rolls and controlled to rotate at a constant rate, and stretching is carried out by said delivery roll, said take-off roll and said group of contact rolls such that the sheet is stretched while subjected to a frictional force acting in the stretching direction.

6. The method for production of an oriented polyolefin sheet as recited in claim 1, wherein, in the stretching step (c), a length L of continuous contact, along the stretching direction, between the sheet and each roll for use in the stretching is maintained within 500 mm.

7. The method for production of an oriented polyolefin sheet as recited in claim 1, wherein, either during or after the stretching step (c), the polyolefin is crosslinked.

8. The method for production of an oriented polyolefin sheet as recited in claim 7, wherein, in the extruding step (a), a photoinitiator is incorporated in the polyethylene which is subsequently extruded into the primary sheet containing the photoinitiator and, either during or after the stretching step (c), the sheet is exposed to an ultraviolet radiation so that the polyolefin is crosslinked.

9. The method for production of an oriented polyolefin sheet as recited in claim 8, wherein the sheet, when exposed to ultraviolet radiation, has a total light transmittance of at least 60%.

10. The method for production of an oriented polyolefin sheet as recited in claim 8, wherein, either during or after the stretching step (c), the sheet is exposed to an electron beam so that the polyolefin is crosslinked.

11. The method for production of an oriented polyolefin sheet as recited in claim 7, wherein, in the extruding step (a), a polyfunctional unsaturated compound is incorporated in the polyethylene, which is subsequently extruded into the primary sheet containing the polyfunctional unsaturated compound and, either during or after the stretching step (c), the polyolefin is crosslinked by the polyfunctional unsaturated compound.

12. The method for production of an oriented polyolefin sheet as recited in claim 1, wherein said polyolefin is polyethylene or polypropylene.

13. The method for production of an oriented polyolefin sheet as recited in claim 1, wherein said polyolefin is an ethylene-α-olefin copolymer which contains 0.1–3 moles of α-olefin having 3 or more carbon atoms per mole of a molecule of the copolymer.

14. The method for production of an oriented polyolefin sheet as recited in claim 13, wherein said ethylene-α-olefin copolymer is an ethylene-propylene or ethylene-1-butene copolymer.

* * * * *